Oct. 14, 1924.
H. R. STUART
ELECTRIC MOTOR
Filed Jan. 3, 1922
1,511,538
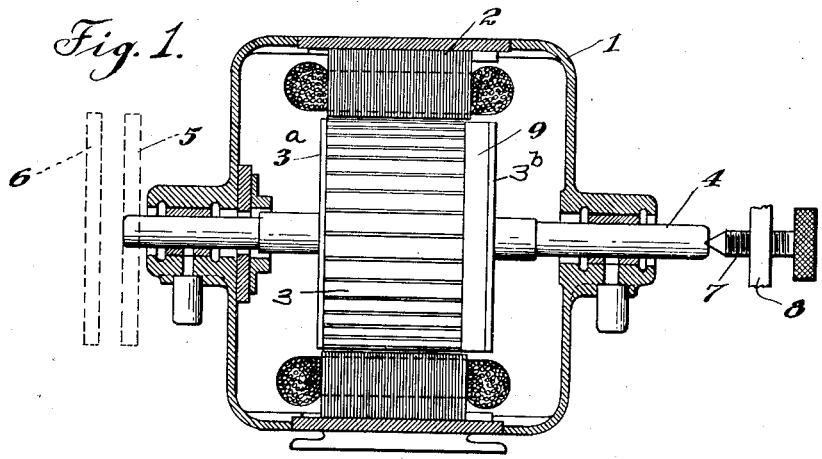
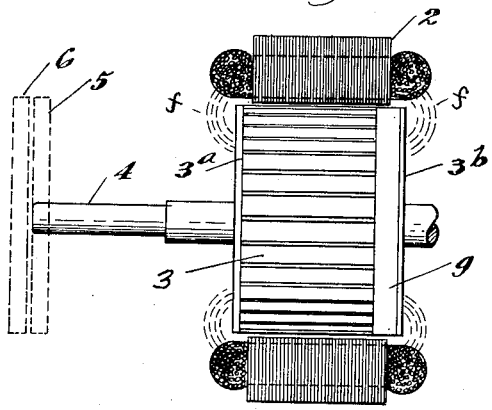
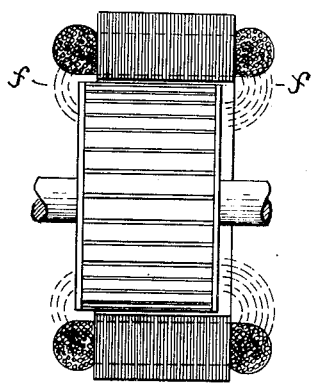
Harve R. Stuart, Inventor
By Staley & Bowman, Attorneys Patented Oct. 14, 1924.

1,511,538

UNITED STATES PATENT OFFICE.

HARVE R. STUART, OF SPRINGFIELD, OHIO, ASSIGNOR TO THE ROBBINS AND MYERS COMPANY, OF SPRINGFIELD, OHIO, A CORPORATION OF OHIO.

ELECTRIC MOTOR.

Application filed January 3, 1922. Serial No. 526,792.

*To all whom it may concern:*

Be it known that I, HARVE R. STUART, a citizen of the United States, residing at Springfield, in the county of Clark and State of Ohio, have invented certain new and useful Improvements in Electric Motors, of which the following is a specification.

My invention relates to improvements in electric motors, and it particularly relates to a motor in which the rotor and its shaft are capable of axial or endwise movement relatively to the stator for certain purposes, one of which will be later explained. The invention is more particularly applicable to both small and large single phase and polyphase induction motors having an axially or endwise movable rotor of the character referred to, the armature of which is of the short circuited type, although the invention is not necessarily limited to these particular types of motors.

In motors of the character referred to in which the rotor is capable of an endwise movement and in which the rotor will have a tendency to center itself within the field after the motor has started, the rotor upon the initial energizing of the motor will first have a tendency to and does move away from its natural centralized position before tending to assume that natural position. In some uses of the motor, therefore, this initial tendency of the rotor to move in a direction opposite to its centering position is attended with undesirable and disastrous results, as for instance, in a structure in which the motor is employed for operating the movable burr of a grinding machine, wherein this initial movement of the rotor results in a clashing of the burrs.

The object of this invention is to prevent this initial movement of the rotor and part or parts connected therewith in a direction opposite to the centering tendency thereof; a further and more specific object in this connection being to provide means for equalizing the flux leakage paths at the respective ends of the rotor whereby the flow of magnetic flux upon the initial energizing of the motor will be equalized at each end of the rotor, thereby preventing the initial displacement of the rotor in a direction opposite to the movement which corresponds with its natural centering tendency due to the action of the flux after the rotor has begun to turn.

In the accompanying drawings:

Fig. 1 is a longitudinal section of a motor embodying my improvements showing associated therewith in a diagrammatic manner a part of a grinding machine, the magnetic core of the armature being shown in a substantially centered position with respect to the fields in this view.

Fig. 2 is a section of a portion of the same showing the magnetic core of the armature out of centered position with respect to the fields.

Fig. 3 is a section similar to Fig. 2 but showing an armature of the old type.

Referring to the drawings, 1 represents the casing of the motor, 2 the fields, 3 the magnetic core and $3^a$ and $3^b$ the nonmagnetic end conducting rings of an armature of the short circuited squirrel cage type; 4 the armature shaft; 5 the rotatable burr of a grinding machine connected with said shaft; 6 a stationary burr; and 7 an adjustable thrust member at the opposite end of the armature shaft which is threaded in a stationary part 8. In such an arrangement the thrust member is adjusted so as to secure the proper distance between the grinding burrs, which may and usually does, result in the armature being moved slightly out of the field center, or, in other words, with the centers of the magnetic cores of the fields and armatures out of line with each other. As a result of this, with the ordinary kind of armature, when the motor is started the armature is first given a throw to the left which would result in a clashing of the grinding burrs. This is due to the fact that the magnetic flux cannot pass through the short circuited rotor when stationary except in small quantities on the principle that alternating flux will not pass through a short circuit of low resistance in any quantity beyond the minute amount necessary to generate the E. M. F. equal to the current times resistance drop. Consequently, the flux at starting will pass through the leakage paths, one of which is around the end rings as shown by the lines $f$ in Figs. 2 and 3. The effect on an armature of the old type as shown in Fig. 3 is that a much greater flux will pass on the right than on the left of the armature rings which causes a pressure on the rotor which tends to move it to the left.

In order to prevent such an action I have devised an armature structure in which one of the rings 3ᵇ is spaced away from the core of the armature to such a distance as will cause it to become symmetrical with the other ring 3ᵃ in its relation to the field so that the amount of flux passing around the end rings upon initial starting is about equal whereby the pressure of the flux is substantially the same in both directions. Consequently, there will be no tendency for the rotor to move in either direction at the initial starting, but when it acquires sufficient speed it will tend to move to the right, or to a position in which the centers of the primary and secondary magnetic cores are on the same line. This movement may not actually take place, however, for the reason that such movement is limited by the thrust device 7, but in any event the movement to the left or in a direction away from the magnetic center of the field is effectively prevented, as has been demonstrated in actual practice. The spaced-away ring 3ᵇ is located at the same end of the rotor as the thrust device. A spacing disk 9 of non-magnetic material is preferably placed between the core 3 and ring 3ᵇ, but the desired result may be obtained by leaving an air space between the ring and core. The core, rings and spacing block are bound together by the rods of the usual form (not shown).

While I have shown a motor in which the armature is the rotor, yet the invention is equally applicable to an arrangement wherein the field is the rotor.

Having thus described my invention, I claim:

1. In an electric motor, a stator member, a rotor member, one of said members being capable of being displaced endwise relatively to the other member, said displaceable member being so constructed as to equalize the flux leakage paths between said members at the ends of the displaceable member when in displaced position at the initial starting of the motor, for the purpose specified.

2. In an electric motor, a stator member, a rotor member, one of said members being capable of being displaced endwise relatively to the other member, the member forming the armature having a magnetic core and end rings, one of said rings being spaced away from said core so as to bring the rings substantially equi-distant from the center of the fields when one of said members is in displaced position.

3. In an electric motor, a stator member, a rotor member, one of said members being capable of being displaced endwise relatively to the other member, the member forming the armature having a magnetic core and non-magnetic end rings, and a spacing disk of non-magnetic material between one only of said rings and said core so as to bring said rings substantially equi-distant from the center of the fields when one of said members has been displaced.

4. In an electric motor, a stationary field, an endwise movable armature having a magnetic core and end rings, said armature being so constructed as to equalize the flux leakage paths about the ends of said armature when said armature is displaced from centralized position in the fields at the initial starting of the motor.

5. In an electric motor, a stationary field, an endwise movable armature having a magnetic core, non-magnetic end conducting rings, one only of said rings being spaced from said core so as to bring said rings substantially equi-distant from the center of the field when said armature has been displaced from a centralized position in the field.

6. In an electric motor, a stationary field, a longitudinal movable armature having a magnetic core and non-magnetic end conducting rings, and a spacing block of non-magnetic material between one of said rings and said core to unequally space the rings relatively to the core, for the purpose of bringing said rings substantially equi-distant from the center of the field when the armature has been displaced from a centralized position in the field.

7. In an electric motor, a stator member, a rotor member, said rotor member being movable longitudinally relatively to the other member, said rotor member being so constructed as to equalize the flux fields at the ends of said member at the initial starting of the motor when the magnetic cores of said members are abnormally positioned with respect to each other.

8. In an electric motor, a stator member, a rotor member, said rotor member being movable relatively to the other member, the member constituting the armature having a magnetic core and non-magnetic end conducting rings, the ring at that end of the core which is closest to the magnetic center of the field core being spaced further away from said rotor core than the other ring, for the purpose specified.

9. In an electric motor, a stator member, a rotor member, said rotor member being capable of being displaced longitudinally relatively to the other member, an element rotatably connected with said rotor member and cooperating with a stationary element, adjustable means for holding the rotor member in displaced position to regulate the distance between said elements, and means incorporated in the rotor member for equalizing the flux leakage paths between said members at the ends of the rotor member at the initial starting of the motor.

10. In an electric motor, a stator member, a rotor member, the rotor member being capable of being displaced longitudinally relatively to the other member, an element connected with said rotor member and cooperating with another stationary element, and adjustable means for holding the rotor member in displaced position to regulate the distance between said elements, the member forming the armature having a magnetic core and non-magnetic end rings so arranged relatively to said core as to equalize the flux paths at the ends of said armature member at the initial starting of the motor.

11. In an electric motor, stationary fields, a longitudinally movable armature having a magnetic core and non-magnetic end rings, a stationary element, a rotatable element cooperating therewith and connected with said armature and adjustable means for holding the armature in displaced position relatively to the fields to regulate the distance between said elements, said rings being so arranged relatively to said core as to equalize the flux paths at the ends of said armature at the initial starting of the motor.

12. In an electric motor, a stator and a rotor, said parts being capable of being placed in such relative positions that the magnetic centers of their cores will be out of line, and means incorporated in the rotor for reducing the flux leakage paths at the ends of the rotor while said rotor and stator are in displaced position at the initial starting of the motor.

13. In an electric motor, a stator member, a rotor member, said rotor member being capable of being displaced endwise relatively to said stator member, and means incorporated in the rotor member when said rotor member is in displaced position for preventing a substantially greater flow of magnetic flux about that end thereof furthest removed from the magnetic center of the stator member than at the other end thereof, at the initial energization of the motor.

14. In an electric motor, a stator member, a rotor member, said rotor member being capable of being displaced with reference to the stator, said rotor member having end rings disposed substantially equi-distant from the center line of the stator when the rotor is in displaced position, for the purpose specified.

In testimony whereof, I have hereunto set my hand this 21st day of December, 1921.

HARVE R. STUART.